US010941265B2

(12) United States Patent
Nakayama et al.

(10) Patent No.: US 10,941,265 B2
(45) Date of Patent: Mar. 9, 2021

(54) POLYPROPYLENE-TYPE RESIN PRE-EXPANDED PARTICLES, AND METHOD FOR PRODUCING SAID PRE-EXPANDED PARTICLES

(71) Applicant: KANEKA CORPORATION, Osaka (JP)

(72) Inventors: Ryoji Nakayama, Osaka (JP); Ryuta Kutsumizu, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/251,238

(22) Filed: Jan. 18, 2019

(65) Prior Publication Data

US 2019/0153188 A1 May 23, 2019

Related U.S. Application Data

(63) Continuation of application No. PCT/JP2017/025397, filed on Jul. 12, 2017.

(30) Foreign Application Priority Data

Jul. 19, 2016 (JP) ............................ JP2016-141054

(51) Int. Cl.

| | |
|---|---|
| ***C08J 9/18*** | (2006.01) |
| ***C08F 10/06*** | (2006.01) |
| ***C08J 9/16*** | (2006.01) |
| ***C08J 3/24*** | (2006.01) |
| ***B29C 44/00*** | (2006.01) |
| ***B29C 67/20*** | (2006.01) |
| ***C08L 23/10*** | (2006.01) |

(52) U.S. Cl.

CPC ................. *C08J 9/18* (2013.01); *B29C 44/00* (2013.01); *B29C 67/20* (2013.01); *C08F 10/06* (2013.01); *C08J 3/24* (2013.01); *C08J 9/16* (2013.01); *C08L 23/10* (2013.01); *C08F 2500/11* (2013.01); *C08F 2500/12* (2013.01); *C08F 2500/17* (2013.01); *C08J 2201/026* (2013.01); *C08J 2201/03* (2013.01); *C08J 2201/038* (2013.01); *C08J 2323/10* (2013.01)

(58) Field of Classification Search

CPC ......... B29C 44/00; B29C 67/20; C08F 10/06; C08F 2500/11; C08F 2500/12; C08F 2500/17; C08J 3/24; C08J 9/16; C08J 9/18; C08J 2201/026; C08J 2201/03; C08J 2201/038; C08J 2323/10; C08L 23/10

See application file for complete search history.

(56) References Cited

U.S. PATENT DOCUMENTS

| | | | | |
|---|---|---|---|---|
| 4,504,601 | A * | 3/1985 | Kuwabara | B29C 44/3453 264/53 |
| 5,716,998 | A * | 2/1998 | Munakata | C08J 9/16 521/58 |
| 6,313,226 | B1 | 11/2001 | Yasaka et al. | |
| 6,326,409 | B1 * | 12/2001 | Mihayashi | C08J 9/0061 521/134 |
| 6,875,484 | B1 | 4/2005 | Kogure et al. | |
| 2007/0054971 | A1 | 3/2007 | Hiroshige et al. | |
| 2010/0193984 | A1 | 8/2010 | Hiroshige et al. | |
| 2012/0264886 | A1 | 10/2012 | Okura et al. | |
| 2014/0242335 | A1 | 8/2014 | Kondo et al. | |
| 2015/0004394 | A1 | 1/2015 | Hotta et al. | |
| 2015/0175789 | A1 | 6/2015 | Klimke et al. | |
| 2015/0284526 | A1 * | 10/2015 | Yoshida | C08J 9/0028 220/669 |

FOREIGN PATENT DOCUMENTS

| | | | |
|---|---|---|---|
| CN | 1856532 | A | 11/2006 |
| CN | 102574948 | A | 7/2012 |
| CN | 103917595 | A | 7/2014 |
| JP | H09-302131 | A | 11/1997 |
| JP | H09-309964 | A | 12/1997 |
| JP | 2008255213 | A | 10/2008 |
| JP | 2008-274024 | A | 11/2008 |
| JP | 2009-256460 | A | 11/2009 |
| JP | 2009-293020 | A | 12/2009 |
| JP | 2012121975 | A | 6/2012 |
| JP | 2013-199644 | A | 10/2013 |
| JP | 2015-108033 | A | 6/2015 |
| WO | 2014/084165 | A1 | 6/2014 |

OTHER PUBLICATIONS

International Search Report issued in International Application No. PCT/JP20171025397, dated Oct. 10, 2017 (2 pages).

International Preliminary Report on Patentability issued in International Application No. PCT/JP2017/025397, dated Jan. 31, 2019 (8 pages).

Extended European Search Report issued in corresponding European Application No. 17830918; dated Feb. 13, 2020 (8 pages).

* cited by examiner

*Primary Examiner* — Irina S Zemel

(74) *Attorney, Agent, or Firm* — Osha Bergman Watanabe & Burton LLP

(57) ABSTRACT

Pre-expanded polypropylene-based resin particles include a polypropylene-based resin. The polypropylene-based resin satisfies tan $\delta \leq 0.32 \times V + 0.1$, where tan δ represents a loss tangent at an angular frequency of 0.1 rad/s in dynamic viscoelastic behavior measurement at 200° C. and V represents a melt fracture take-up speed (m/min) at 200° C.

11 Claims, No Drawings

POLYPROPYLENE-TYPE RESIN PRE-EXPANDED PARTICLES, AND METHOD FOR PRODUCING SAID PRE-EXPANDED PARTICLES

TECHNICAL FIELD

One or more embodiments of the present invention relate to (i) pre-expanded polypropylene-based resin particles and (ii) a method for producing such pre-expanded polypropylene-based resin particles.

BACKGROUND

An in-mold expanded molded product/article which is obtained with use of pre-expanded polypropylene-based resin particles has characteristics of, for example, being formed in any shape, being shock-absorbing, being light in weight, and being heat insulating, which characteristics are advantages of an in-mold expanded molded product/article.

In comparison with an in-mold expanded molded product/article which is obtained with use of any other resin, for example, an in-mold expanded molded product/article which is obtained with use of pre-expanded polystyrene-based resin particles, the in-mold expanded molded product/article which is obtained with use of the pre-expanded polypropylene-based resin particles are excellent in chemical resistance, heat resistance, and strain recovery rate after compression. Furthermore, in comparison with an in-mold expanded molded product/article which is obtained with use of pre-expanded polyethylene-based resin particles, the in-mold expanded molded product/article which is obtained with use of the pre-expanded polypropylene-based resin particles is excellent in dimension accuracy, heat resistance, and compressive strength. Due to the above characteristics, the in-mold expanded molded product/article which is obtained with use of the pre-expanded polypropylene-based resin particles is used for various things, for example, not only for automobile interior materials and automobile bumper core materials but also for heat insulating materials and shock-absorbing packing materials.

The pre-expanded polypropylene-based resin particles used to obtain such a polypropylene-based resin in-mold expanded product are typically obtained by a so-called "pressure-release expansion method (from a high pressure condition to a low pressure condition to expand particles)" in which (i) polypropylene-based resin particles and a volatile foaming agent are dispersed in water contained in a pressure vessel, (ii) a resultant mixture is heated to a temperature close to a melting point of a polypropylene-based resin so that the polypropylene-based resin particles are impregnated with the volatile foaming agent, and (iii) while the temperature and pressure in the pressure-resistant vessel are being kept constant under increased pressure which is equal to or higher than steam pressure exhibited by the volatile foaming agent, the mixture in which the polypropylene-based resin particles impregnated with the volatile foaming agent are dispersed in the water is released to an atmosphere having pressure lower than the pressure in the pressure-resistant vessel.

The pre-expanded polypropylene-based resin particles obtained by the pressure-release expansion method have two melting peaks in a case where the pre-expanded polypropylene-based resin particles are subjected to differential scanning calorimetry (DSC), because crystals which melt at a temperature higher than the melting point of the polypropylene-based resin are newly formed during a production process for obtaining the pre-expanded polypropylene-based resin particles. Since the pre-expanded polypropylene-based resin particles obtained by the pressure-release expansion method are in such a crystalline state that the pre-expanded polypropylene-based resin particles have the two melting peaks, it is easy to control an amount of crystals to be melted during in-mold molding, and it is therefore possible to obtain in-mold expanded molded products/articles having various shapes.

However, the production process for obtaining the pre-expanded polypropylene-based resin particles involves, first, (i) a pelletizing step of causing, in an extruder, the polypropylene-based resin particles to have a size suitable for expansion and then (ii) an expanding step of expanding the polypropylene-based resin particles in the pressure-resistant vessel. As such, two steps are needed to obtain the pre-expanded polypropylene-based resin particles, and accordingly significant investment in equipment is required. Moreover, according to the pressure-release expansion method, a dispersion medium such as water is used. Therefore, a liquid waste treatment system is required.

Therefore, pre-expanded particles are strongly demanded which can be produced by an extrusion foaming method that involves a single step and that does not require a liquid waste system.

Under the circumstances, attempts to obtain pre-expanded particles by the extrusion foaming method, which requires a lower production cost, have been made. For example, a method and the like have been suggested in which extrusion foaming is carried out with use of a modified polypropylene-based resin obtained by melting and kneading a polypropylene-based resin, an aromatic vinyl monomer and/or an isoprene monomer, and a radical generating agent (Patent Literatures 1 and 2). However, surfaces of pre-expanded polypropylene-based resin particles produced by those methods are poorly stretched during in-mold molding. Furthermore, the pre-expanded polypropylene-based resin particles produced by those methods considerably shrink immediately after molding. Therefore, the pre-expanded polypropylene-based resin particles may not be formed into various shapes.

Meanwhile, Patent Literatures 3 and 4 each disclose a polypropylene-based resin which is excellent in extrusion foaming property. However, Patent Literatures 3 and 4 each do not disclose a method for producing a particulate expanded product (pre-expanded particles). Therefore, there is a case where, even with use of such a resin, pre-expanded particles which are excellent in moldability during in-mold molding are not obtained.

CITATION LIST

Patent Literature

[Patent Literature 1] Japanese Patent Application Publication, Tokukaihei, No. 9-302131
[Patent Literature 2] Japanese Patent Application Publication, Tokukai, No. 2009-256460
[Patent Literature 3] Japanese Patent Application Publication, Tokukai, No. 2009-293020
[Patent Literature 4] Japanese Patent Application Publication, Tokukaihei, No. 9-309964

SUMMARY

One or more embodiments of the present invention provide pre-expanded polypropylene-based resin particles which are low in open cell ratio and excellent in moldability during in-mold molding and which are obtained without a complicated production process.

The inventors carried out diligent studies and consequently found that pre-expanded particles which satisfy both of an extrusion foaming property and moldability are obtained with use of a polypropylene-based resin which meets a specific requirement. As a result, the inventors accomplished one or more embodiments of the present invention.

That is, one or more embodiments of the present invention are as follows:

Pre-expanded polypropylene-based resin particles including a polypropylene-based resin that satisfies Expression (1):

$$\tan \delta \leq 0.32 \times V + 0.1 \quad (1)$$

where: tan δ represents a loss tangent at an angular frequency of 0.1 rad/s in dynamic viscoelastic behavior measurement at 200° C.; and V represents a melt fracture take-up speed (m/min) at 200° C.

According to one or more embodiments of the present invention, it is possible to provide pre-expanded polypropylene-based resin particles which are low in open cell ratio, particularly, in internal open cell ratio, which greatly affects moldability during in-mold molding, and are excellent in moldability during in-mold molding and which are obtained without a complicated production process.

DETAILED DESCRIPTION OF EMBODIMENTS

Pre-expanded polypropylene-based particles in accordance with one or more embodiments of the present invention include a polypropylene-based resin that satisfies Expression (1):

$$\tan \delta \leq 0.32 \times V + 0.1 \quad (1)$$

where: tan δ represents a loss tangent at an angular frequency of 0.1 rad/s in dynamic viscoelastic behavior measurement at 200° C.; and V represents a melt fracture take-up speed (m/min) at 200° C.

In a case where Expression (1) is not satisfied, it is difficult to obtain pre-expanded particles having a high expansion ratio and a low internal open cell ratio.

The polypropylene-based resin used in one or more embodiments of the present invention is not particularly limited, provided that the polypropylene-based resin satisfies Expression (1). The polypropylene-based resin can be a general-purpose linear polypropylene-based resin or can be alternatively a modified polypropylene-based resin having a branched structure or a high-molecular-weight component. Out of such polypropylene-based resins, the modified polypropylene-based resin may be preferable because the modified polypropylene-based resin easily satisfies Expression (1). The modified polypropylene-based resin is produced by, for example, irradiating the linear polypropylene-based resin (hereinafter, also referred to as a "raw material polypropylene-based resin") with a radial ray or melting and mixing the linear polypropylene-based resin, a conjugated diene compound, and a radical polymerization initiator. According to one or more embodiments of the present invention, the modified polypropylene-based resin having a branched structure is particularly preferable as the polypropylene-based resin, and the modified polypropylene-based resin which is obtained by melting and mixing the linear polypropylene-based resin, the conjugated diene compound, and the radical polymerization initiator is preferable because such a modified polypropylene-based resin is easily produced and is economically advantageous.

Examples of the linear polypropylene-based resin which can be used in one or more embodiments of the present invention encompass homopolymers, block copolymers, and random copolymers of propylene each of which polymers is a crystalline polymer. In one or more embodiments, such copolymers of propylene are each preferably a polymer containing propylene at a proportion of not less than 75% by weight, because such a polymer retains crystallinity, rigidity, chemical resistance, and the like, which are characteristics of a polypropylene-based resin. Examples of α-olefin which can be copolymerized with propylene encompass: α-olefin having 2 or 4 to 12 carbon atoms, such as ethylene, 1-butene, isobutene, 1-pentene, 3-methyl-1-butene, 1-hexene, 4-methyl-1-pentene, 3,4-dimethyl-1-butene, 1-heptene, 3-methyl-1-hexene, 1-octene, and 1-decene; cyclic olefin such as cyclopentene, norbornene, and tetracyclo[6,2,11,8,13,6]-4-dodecene; diene such as 5-methylene-2-norbornene, 5-ethylidene-2-norbornene, 1,4-hexadiene, methyl-1,4-hexadiene, and 7-methyl-1,6-octadiene; and vinyl monomers such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, vinyltoluene, and divinylbenzene. In one or more embodiments, ethylene and 1-butene are preferable due to their improved resistance to brittleness at low temperature, inexpensiveness, and the like. Each of those α-olefins can be used solely. Alternatively, two or more of those α-olefins can be used in combination.

Out of those polymers, in view of (i) moldability, during in-mold molding, of pre-expanded particles to be obtained and (ii) physical properties of a molded product to be obtained, the random copolymers may be preferable, and a propylene/ethylene/1-butene random copolymer or a propylene/ethylene random copolymer may be more preferable.

The modified polypropylene-based resin which can be used in one or more embodiments of the present invention is preferably a modified polypropylene-based resin obtained by melting and mixing the linear polypropylene-based resin, the conjugated diene compound, and the radical polymerization initiator.

Examples of the conjugated diene compound encompass butadiene, isoprene, 1,3-heptadiene, 2,3-dimethylbutadiene, and 2,5-dimethyl-2,4-hexadiene. Each of those conjugated diene compounds can be used solely. Alternatively, two or more of those conjugated diene compounds can be used in combination. Out of those conjugated diene compounds, butadiene and isoprene may be particularly preferable because butadiene and isoprene are inexpensive, easy to handle, and uniformly reacted.

In one or more embodiments, the conjugated diene compound is added in an amount of preferably not less than 0.01 parts by weight and not more than 20 parts by weight, more preferably not less than 0.05 parts by weight and not more than 5 parts by weight, with respect to 100 parts by weight of the linear polypropylene-based resin. In a case where the amount of the conjugated diene compound is less than 0.01 parts by weight, an effect of modification is difficult to achieve. In a case where the amount of the conjugated diene compound is more than 20 parts by weight, the effect becomes saturated. This may be economically disadvantageous.

A monomer which can be copolymerized with the conjugated diene compound can be used in combination. Examples of the monomer encompass: acrylic ester such as vinyl chloride, vinylidene chloride, acrylonitrile, methacrylonitrile, acrylamide, methacrylamide, vinyl acetate, acrylic acid, methacrylic acid, maleic acid, maleic anhydride, acrylic metal salt, methacrylic metal salt, methyl acrylate, ethyl acrylate, butyl acrylate, 2-ethylhexyl acrylate, and stearyl acrylate; and methacrylic ester such as methyl methacrylate, ethyl methacrylate, butyl methacrylate, 2-ethylhexyl methacrylate, and stearyl methacrylate.

Examples of the radical polymerization initiator typically encompass peroxide and azo compounds. In one or more embodiments, the radical polymerization initiator is an initiator having ability to abstract hydrogen from the polypropylene-based resin and/or the conjugated diene compound. Examples of such an initiator typically encompass organic peroxide such as ketone peroxide, peroxy ketal, hydroperoxide, dialkyl peroxide, diacyl peroxide, peroxy dicarbonate, and peroxy ester. Out of those initiators, an initiator having high hydrogen abstraction ability may be particularly preferable. Examples of such an initiator encompass: peroxy ketal such as 1,1-bis(t-butyl peroxy)3,3,5-trimethylcyclohexane, 1,1-bis(t-butyl peroxy)cyclohexane, n-butyl 4,4-bis(t-butyl peroxy)valerate, and 2,2-bis(t-butyl peroxy)butane; dialkyl peroxide such as dicumyl peroxide, 2,5-dimethyl-2,5-di(t-butyl peroxy)hexane, α,α'-bis(t-butyl peroxy-m-isopropyl)benzene, t-butyl cumyl peroxide, di-t-butyl peroxide, and 2,5-dimethyl-2,5-di(t-butyl peroxy)-3-hexyne; diacyl peroxide such as benzoyl peroxide; peroxy ester such as t-butyl peroxy octoate, t-butyl peroxy isobutyrate, t-butyl peroxy laurate, t-butyl peroxy 3,5,5-trimethylhexanoate, t-butyl peroxy isopropylcarbonate, 2,5-dimethyl-2,5-di(benzoyl peroxy)hexane, t-butyl peroxy acetate, t-butyl peroxy benzoate, and di-t-butyl peroxy isophthalate. Each of those radical polymerization initiators can be used solely. Alternatively, two or more of those radical polymerization initiators can be used in combination.

In one or more embodiments, the radical polymerization initiator is added in an amount of preferably not less than 0.01 parts by weight and not more than 10 parts by weight, more preferably not less than 0.05 parts by weight and not more than 4 parts by weight, with respect to 100 parts by weight of the linear polypropylene-based resin. In a case where the amount of the radical polymerization initiator falls within the above range, it is possible to achieve effective modification of the resin. In a case where the amount of the radical polymerization initiator is less than 0.01 parts by weight, the effect of the modification is difficult to achieve. In a case where the amount of the radical polymerization initiator is more than 10 parts by weight, the effect of the modification becomes saturated. This may be economically disadvantageous.

Examples of a device for reacting the linear polypropylene-based resin, the conjugated diene compound, and the radical polymerization initiator encompass: a roller mill, a Ko-kneader, a Banbury mixer, a Brabender; kneaders such as a single screw extruder and a twin screw extruder; horizontal stirrers such as a twin screw surface renewal device and a twin screw multi-disk device; and vertical stirrers such as a double helical ribbon stirrer. Out of those devices, a kneader may be preferably used, and an extruder such as the single screw extruder and the twin screw extruder is particularly preferable in view of productivity.

Order or a method of mixing and kneading (stirring) the linear polypropylene-based resin, the conjugated diene compound, and the radical polymerization initiator is not particularly limited. After the linear polypropylene-based resin, the conjugated diene compound, and the radical polymerization initiator are mixed together, they can be melted and kneaded (stirred). Alternatively, after the polypropylene-based resin is melted and kneaded (stirred), the conjugated diene compound and/or the radical initiator can be simultaneously or individually mixed with the polypropylene-based resin, either all at once or in portions. In one or more embodiments, a temperature of the kneader (stirrer) is preferably not lower than 130° C. and not higher than 300° C. because the linear polypropylene-based resin melts but does not thermally decompose in such a range. In one or more embodiments, a preferable melting and kneading time is typically 1 minute to 60 minutes.

A shape and a size of the modified polypropylene-based resin thus obtained are not limited. The modified polypropylene-based resin can be in pellet form.

In one or more embodiments, the loss tangent tan δ of the polypropylene-based resin used in one or more embodiments of the present invention is preferably not less than 0.50 and not more than 1.80, and the melt fracture take-up speed V at 200° C. is preferably not less than 2.5 m/min and not more than 7.0 m/min. By causing tan δ and the melt fracture take-up speed V at 200° C. to fall within the above respective ranges, it tends to become easy to both achieve a high expansion ratio and keep an internal open cell ratio low. Moreover, in one or more embodiments, tan δ is preferably not less than 0.70 and not more than 1.50, and the melt fracture take-up speed V at 200° C. is preferably not less than 3.5 m/min and not more than 6.0 m/min. Note that tan δ of the polypropylene-based resin and the melt fracture take-up speed V at 200° C. are measured by, for example, respective methods described in Examples.

A melt flow rate of the polypropylene-based resin used in one or more embodiments of the present invention is preferably 1.0 g/10 minutes to 10.0 g/10 minutes. In a case where the melt flow rate of the polypropylene-based resin falls within the above range, it is possible to expand the polypropylene-based resin at a high expansion ratio without adding a foaming agent in a large amount. Furthermore, since pressure in a die does not easily decrease during extrusion foaming, the internal open cell ratio does not easily decrease. In a case where the melt flow rate is less than 1.0 g/10 minutes, it is difficult to expand the polypropylene-based resin at a high expansion ratio, and it is necessary to add the foaming agent in a large amount. Particularly, in a case where (i) a carbonic acid gas or the like which is less soluble in a resin is used as the foaming agent and (ii) an amount of the foaming agent is increased, the internal open cell ratio tends to easily deteriorate, and it tends to become difficult to achieve both a high expansion ratio and a low open cell ratio. In a case where the melt flow rate is more than 10 g/10 minutes, the pressure in the die tends to decrease during the extrusion foaming, and the internal open cell ratio tends to easily decrease. Note that the melt flow rate of the polypropylene-based resin is measured by, for example, a method described in Examples.

In one or more embodiments, a melt tension of the polypropylene-based resin used in one or more embodiments of the present invention is usually not less than 1 cN, more preferably not less than 2 cN, particularly preferably not less than 5 cN. In a case where the melt tension of the polypropylene-based resin is not less than 1 cN, pre-expanded particles having a low open cell ratio tend to be easily obtained. Furthermore, the polypropylene-based resin tends to easily satisfy Expression (1). An upper limit of the melt tension of the polypropylene-based resin is not particularly limited, provided that the polypropylene-based resin satisfies Expression (1). However, in one or more embodiments, the upper limit of the melt tension is preferably not more than 12 cN. In a case where the melt tension of the polypropylene-based resin is not more than 12 cN, it is possible to expand the polypropylene-based resin at a high expansion ratio without adding the foaming agent in a large amount. Moreover, the polypropylene-based resin easily satisfies Expression (1), and the internal open cell ratio does not easily increase. Note that the melt tension of the polypropylene-based resin is measured by, for example, a method described in Examples.

In one or more embodiments, a melting point of the polypropylene-based resin in accordance with one or more embodiments of the present invention is preferably not lower than 130° C. and not higher than 155° C., more preferably not lower than 135° C. and not higher than 153° C., still more preferably not lower than 140° C. and not higher than 150° C. In a case where the melting point of the polypropylene-based resin falls within the above range, dimensional stability and heat resistance of an in-mold expanded molded product/article are improved. Moreover, pressure of heating steam for expanding and molding the pre-expanded polypropylene-based resin particles in a mold becomes appropriate. In a case where the melting point of the polypropylene-based resin is less than 130° C., the dimensional stability of the in-mold expanded molded product/article tends to be decreased or the heat resistance of the in-mold expanded molded product/article tends to be insufficient. In a case where the melting point of the polypropylene-based resin is more than 155° C., the pressure of the heating steam for expanding and molding the pre-expanded polypropylene-based resin particles in the mold tends to become high.

Here, the melting point of the polypropylene-based resin is measured as follows with use of a differential scanning calorimeter DSC [for example, manufactured by Seiko Instruments Inc., model: DSC6200]. That is, 5 mg to 6 mg of the polypropylene-based resin is heated from 40° C. to 220° C. at a rate of 10° C./min so that the polypropylene-based resin is melted. The polypropylene-based resin is then cooled from 220° C. to 40° C. at a rate of 10° C./min so that the polypropylene-based resin is crystallized. Subsequently, the polypropylene-based resin is heated again from 40° C. to 220° C. at a rate of 10° C./min. A melting peak temperature shown in a DSC curve obtained after the second heating is regarded as the melting point.

The internal open cell ratio of the pre-expanded polypropylene-based resin particles in accordance with one or more embodiments of the present invention is preferably not more than 40%. The internal open cell ratio indicates a numerical value measured from half-cut pre-expanded particles by a method identical to a method for measuring a conventional open cell ratio. The conventional open cell ratio, measured without cutting pre-expanded particles, may exhibit an apparently good value due to skin layers which cover peripheries of the pre-expanded particles, even in a case where internal cells in the pre-expanded particles are communicated with each other. However, in a case where such pre-expanded particles are heated by steam during in-mold molding, the skin layers may be destroyed, so that desired expandability may not be exerted and molding may become difficult. In contrast, by controlling the internal open cell ratio to be not more than 40%, pre-expanded particles which are excellent in moldability tend to be easily obtained. In one or more embodiments, the internal open cell ratio is more preferably not more than 30%.

The open cell ratio of the pre-expanded particles in accordance with one or more embodiments of the present invention is preferably not more than 6%. By controlling the open cell ratio to be not more than 6%, the pre-expanded particles tend to have a low internal open cell ratio and excellent moldability.

As a method for producing the pre-expanded polypropylene-based resin particles in accordance with one or more embodiments of the present invention, a so-called extrusion foaming method may be preferable in which (i) the polypropylene-based resin and the foaming agent are fed to an extruder, (ii) the polypropylene-based resin and the foaming agent are melted and kneaded and then cooled to obtain an expandable molten resin (molten resin containing the foaming agent), (iii) the expandable molten resin (molten resin containing the foaming agent) is extruded to a lower-pressure region through a microporous die attached to an end of the extruder, and then (iv) the expandable molten resin thus extruded is finely cut to obtain the pre-expanded polypropylene-based resin particles.

In the extrusion foaming method, a finely cutting method for obtaining the pre-expanded particles is roughly divided into a cold cut method and a hot cut method. The cold cut method encompass a method in which (i) the molten resin, containing the foaming agent, extruded through the microporous die is expanded and (ii) strands of expanded resin thus obtained are taken up and then finely cut while the strands of expanded resin are being cooled in a water tank (strand cut method). The hot cut method is a method in which the molten resin extruded through the microporous die is cut with use of a cutter which rotates in a state where the cutter is in contact with a surface of the die. The hot cut method is further divided into the following two methods depending on a cooling method. That is, one is a method in which (i) a chamber attached to an end of the die is filled with a cooling medium, which is adjusted to have given pressure, so that the cooling medium is in contact with the die and (ii) the molten resin extruded through the microporous die is cut in water (underwater cut method). The other one is a method in which (i) a cooling drum, having an inner peripheral surface along which the cooling medium flows, is connected to a front part of the die and (ii) while expanded particles, having been cut with use of the cutter, are being expanded or after the expanded particles are expanded, the expanded particles are cooled by causing the expanded particles to be in contact with the cooling medium (watering cut method). Out of those methods, the hot cut method may be preferable because pre-expanded particles having a low internal open cell ratio are easily obtained, and the watering cut method may be more preferable because a high expansion ratio is easily achieved.

Example of the foaming agent used in one or more embodiments of the present invention encompass: aliphatic hydrocarbon such as propane, normal butane, isobutane, normal pentane, isopentane, and hexane; alicyclic hydrogen such as cyclopentane and cyclobutane; inorganic gases such as air, nitrogen, and a carbonic acid gas; and water. Each of those foaming agents can be used solely. Alternatively, two or more of those foaming agents can be used in combination. Out of those foaming agents, an inorganic gas or water may be preferable because they are safely used and because required equipment specifications are simple. Out of those foaming agents, the inorganic gas, particularly, the carbonic acid gas may be preferable because pre-expanded particles having a high expansion ratio are easily obtained. An amount of the foaming agent varies depending on a kind of the foaming agent and a target expansion ratio of the pre-expanded polypropylene-based particles. Therefore, the amount of the foaming agent can be adjusted as appropriate. The foaming agent may be added in an amount of preferably not less than 1 part by weight and not more than 20 parts by weight, more preferably not less than 2 parts by weight and not more than 15 parts by weight, with respect to 100 parts by weight of the polypropylene-based resin.

A cell nucleating agent can be further added so as to control shapes of cells in the pre-expanded polypropylene-based resin particles. Examples of the cell nucleating agent encompass a sodium bicarbonate-citric acid mixture, monosodium citrate, talc, and calcium carbonate. Each of those cell nucleating agents can be used solely. Alternatively, two or more of those cell nucleating agents can be used in combination. An amount of the cell nucleating agent is not particularly limited. In one or more embodiments, the cell nucleating agent is added in an amount of preferably not less than 0.01 parts by weight and not more than 5 parts by weight with respect to 100 parts by weight of the polypropylene-based resin.

Furthermore, a synthetic resin, other than the polypropylene-based resin, can be added to the polypropylene-based resin, and a resin thus obtained can be used as a base resin, provided that the synthetic resin does not impair the effect. Examples of the synthetic resin other than the polypropylene-based resin encompass: ethylene-based resins such as high-density polyethylene, medium-density polyethylene, low-density polyethylene, linear low-density polyethylene, linear very-low-density polyethylene, an ethylene-vinyl acetate copolymer, an ethylene-acrylic acid copolymer, and an ethylene-methacrylic acid copolymer; and styrene-based resins such as polystyrene, a styrene-maleic anhydride copolymer, and a styrene-ethylene copolymer.

According to one or more embodiments of the present invention, an additive(s), such as a stabilizer (e.g., an antioxidant, a metal deactivator, a phosphorous processing stabilizer, a ultraviolet absorber, a ultraviolet stabilizer, a fluorescent brightening agent, metallic soap, and an antacid adsorbent), a crosslinking agent, a chain transfer agent, a nucleating agent, a lubricant, a plasticizer, a filler, a reinforcer, a pigment, a dye, a flame retarder, and/or an antistatic agent, can be added as necessary. Examples of the antacid adsorbent encompass magnesium oxide and hydrotalcite.

According to one or more embodiments of the present invention, there is no limitation on addition of a coloring agent. No coloring agent can be added so as to produce natural color. Alternatively, a blue coloring agent, a red coloring agent, a black coloring agent, and/or the like can be added so as to produce desired color. Examples of the coloring agent encompass a perylene-based organic pigment, an azo-based organic pigment, a quinacridone-based organic pigment, a phthalocyanine-based organic pigment, an indanthrene-based organic pigment, a dioxazine-based organic pigment, an isoindoline-based organic pigment, and carbon black.

The expansion ratio of the expanded polypropylene-based resin particles in accordance with one or more embodiments of the present invention is not particularly limited, but may be preferably not less than 3 times and not more than 50 times, more preferably not less than 7 times and not more than 30 times.

In a case where the expansion ratio of the pre-expanded polypropylene-based resin particles does not reach the above range, a method of increasing the expansion ratio by pressuring insides of the pre-expanded polypropylene-based resin particles with use of an inert gas and heating the pre-expanded polypropylene-based resin particles (for example, a method disclosed in Japanese Patent Application Publication, Tokukaihei, No. 10-237212) can be further employed.

A weight of the pre-expanded polypropylene-based resin particles in accordance with one or more embodiments of the present invention is preferably not more than 3 mg/particle, more preferably not more than 2 mg/particle, because, in a case where the mold is filled with such pre-expanded polypropylene-based resin particles and the pre-expanded polypropylene-based resin particles are expanded, the pre-expanded polypropylene-based resin particles are easily formed into a molded product having beautiful appearance. A lower limit is not particularly limited, but may be preferably not less than 0.3 mg/particle in view of productivity and the like.

A cell diameter of the pre-expanded polypropylene-based resin particles in accordance with one or more embodiments of the present invention may be preferably 0.1 mm to 1.0 mm, more preferably 0.2 mm to 0.7 mm, because such pre-expanded polypropylene-based resin particles are expanded throughout the mold during in-mold expansion molding and a polypropylene-based resin in-mold expanded molded product/article to be obtained will little shrink.

The polypropylene-based resin in-mold expanded molded product/article in accordance with one or more embodiments of the present invention is obtained by (i) filling the mold, which can be closed up but is not sealed up, with the pre-expanded polypropylene-based resin particles and (ii) heating the pre-expanded polypropylene-based resin particles by steam so that the pre-expanded polypropylene-based resin particles are molded.

In order that the polypropylene-based resin in-mold expanded molded product/article is molded from the pre-expanded polypropylene-based resin particles in accordance with one or more embodiments of the present invention, any of the following methods can be, for example, employed: A) a method in which (i) expanded particles are pressured with use of an inorganic gas so that the expanded particles are impregnated with the inorganic gas and have given internal pressure, (ii) a mold is filled with the expanded particles, and (iii) the expanded particles are heated by steam or the like so as to be fused together (for example, Japanese Patent Publication, Tokukoushou, No. 51-22951); B) a method in which (i) expanded particles are compressed by gas pressure, (ii) a mold is filled with the expanded particles, and (iii) the expanded particles are heated by steam or the like so as to be fused together while compression recovery of the expanded particles is utilized (for example, Japanese Patent Publication, Tokukoushou, No. 53-33996); and C) a method in which (i) a mold whose gap is open is filled with expanded particles, (ii) the mold is closed, until the gap has a given width, so that the expand particles, with which the mold is filled, are compressed, and (iii) the expanded particles are heated by steam or the like so as to be fused together.

Note that one or more embodiments of the present invention can be arranged as follows:

[1] Pre-expanded polypropylene-based resin particles including a polypropylene-based resin that satisfies Expression (1):

$$\tan\delta \leq 0.32 \times V + 0.1 \quad (1)$$

where: tan δ represents a loss tangent at an angular frequency of 0.1 rad/s in dynamic viscoelastic behavior measurement at 200° C.; and V represents a melt fracture take-up speed (m/min) at 200° C.

[2] The pre-expanded polypropylene-based resin particles described in [1], wherein tan δ in Expression (1) is 0.50 to 1.80.

[3] The pre-expanded polypropylene-based resin particles described in [1] or [2], wherein V in Expression (1) is 2.5 to 7.0 (m/min).

[4] The pre-expanded polypropylene-based resin particles described in any one of [1] through [3], wherein a melt flow rate of the polypropylene-based resin is 1.0 g/10 minutes to 10.0 g/10 minutes.

[5] The pre-expanded polypropylene-based resin particles described in any one of [1] through [4], wherein a melting point of the polypropylene-based resin is 135° C. to 155° C.

[6] The pre-expanded polypropylene-based resin particles described in any one of [1] through [5], wherein an internal open cell ratio of the pre-expanded polypropylene-based resin particles is not more than 40%.

[7] The pre-expanded polypropylene-based resin particles described in [6], wherein the internal open cell ratio of the pre-expanded polypropylene-based resin particles is not more than 30%.

[8] The pre-expanded polypropylene-based resin particles described in any one of [1] through [7], wherein an open cell ratio of the pre-expanded polypropylene-based resin particles is not more than 6%.

[9] The pre-expanded polypropylene-based resin particles described in any one of [1] through [8], wherein a melt tension of the polypropylene-based resin is not more than 12 cN.

[10] A method for producing pre-expanded polypropylene-based resin particles described in any one of [1] through [9].

[11] The method described in [10], including the steps of:

feeding a polypropylene-based resin and a foaming agent to an extruder;

melting and kneading and cooling the polypropylene-based resin and the foaming agent to obtain a molten resin containing the foaming agent; and extruding the molten resin, containing the foaming agent, to a lower-pressure region through a microporous die, attached to an end of the extruder, and finely cutting the molten resin extruded.

[12] An expanded molded product which is obtained by molding, in a mold, pre-expanded polypropylene-based resin particles described in any one of [1] through [9].

EXAMPLES

One or more embodiments of the present invention will be described below in more detail with reference to Examples. Note, however, that the present invention is not limited to such Examples.

In each of Examples and Comparative Examples, the following test methods and criteria were used in various evaluation methods.

<Melt Flow Rate (MFR)>

An MFR was measured with use of a melt indexer S-01 (manufactured by TOYO SEIKI SEISAKU-SHO, LTD) in accordance with the method A specified in JIS K 7210 (1999). Further, an amount of a resin having been extruded in a certain time through a die under a constant load at 230° C. was converted into an amount of the resin extruded in 10 minutes, and such a converted amount was regarded as an MFR.

The constant load was set to 5.00 kg in a case where an olefin-based elastomer was employed, and was set to 2.16 kg in a case where a modified polypropylene-based resin was employed.

Note that the certain time was 120 seconds in a case where the melt flow rate was more than 0.5 g/10 minutes and not more than 1.0 g/10 minutes, was 60 seconds in a case where the melt flow rate was more than 1.0 g/10 minutes and not more than 3.5 g/10 minutes, was 30 seconds in a case where the melt flow rate was more than 3.5 g/10 minutes and not more than 10 g/10 minutes, was 10 seconds in a case where the melt flow rate was more than 10 g/10 minutes and not more than 25 g/10 minutes, was 5 seconds in a case where the melt flow rate was more than 25 g/10 minutes and not more than 100 g/10 minutes, and was 3 seconds in a case where the melt flow rate was more than 100 g/10 minutes.

Three cut-off pieces were collected each of which had been cut off in the certain time. An average of melt flow rates of the three cut-off pieces was calculated as a melt flow rate of the resin. In a case where three cut-off pieces could not be collected in a single measurement, another or other measurements were carried on until three cut-off pieces could be collected. In a case where a melt flow rate measured with a certain number of seconds did not fall under a corresponding range, another measurement was carried out with the number of seconds corresponding to the melt flow rate.

<Melt Tension (MT)>

A Capirograph (manufactured by TOYO SEIKI SEISAKU-SHO, LTD) was used which was equipped with an attachment for measurement of a melt tension and which had a φ10 mm cylinder having, at its end, a φ1 mm orifice having a length of 10 mm. A strand, discharged through a die in a case where a piston was caused to fall at a falling speed of 10 mm/min at 200° C., was wound on a load cell-equipped pulley located 350 mm below, and taken up at a speed of 1 m/min. After the strand was stabilized, such a take-up speed was increased at such a rate that the take-up speed reached 200 m/min in 4 minutes, and a load (unit: cN) applied to the load cell-equipped pulley when the strand was broken was regarded as a melt tension. Note that, in a case where the strand was not broken, the load which was applied to the load cell-equipped pulley and which was not increased any more even in a case where the take-up speed was increased was regarded as a melt tension.

<Melt Fracture Take-Up Speed V>

A melt fracture take-up speed V refers to the take-up speed when the strand was broken in a case where the take-up speed was increased in measurement of the melt tension. Note that, in a case where the strand was not broken, the melt fracture take-up speed V refers to the take-up speed at a time point when the load applied to the load cell-equipped pulley was not increased any more even in a case where the take-up speed was increased. The melt fracture take-up speed V was used as an index of ductility of a molten resin during expansion.

<Loss Tangent Tan δ>

A polypropylene-based resin was heat-pressed for 5 minutes at 190° C. with use of a spacer having a thickness of 1.5 mm so as to prepare a pressed plate having a thickness of 1.5 mm, and a test piece was punched out from the pressed plate with use of a φ25 mm punch. As a measurement device, a viscoelastic measuring device ARES manufactured by TA Instruments was used. A φ25 mm parallel plate type jig was attached to the viscoelastic measuring device. A constant temperature bath was arranged so as to surround the jig, and the constant temperature bath was kept heated at 200° C. so that the jig was preheated. Subsequently, the constant temperature bath was opened, and the φ25 mm test piece was inserted between parallel plates. The constant temperature bath was then closed, and the test piece was preheated for 5 minutes. Thereafter, a gap between the parallel plates was narrowed to 1 mm so that the test piece was compressed. After compression, the constant temperature bath was opened again, and a resin which protruded from the parallel plates was removed with use of a brass spatula. The constant temperature bath was closed, and the constant temperature bath was kept heated for 5 minutes. After that, measurement of dynamic viscoelastic behavior was started. The measurement was carried out at an angular frequency in a range of 0.1 rad/s to 100 rad/s. A storage modulus of elasticity and a loss modulus of elasticity at each angular frequency were obtained, and a loss tangent tan δ at the each angular frequency was obtained as a calculated value. Out of those results, a value of a loss tangent tan δ at an angular frequency of 0.1 rad/s was employed. Note that the measurement was carried out with a strain amount of 5% under a nitrogen atmosphere.

<Measurement of Melting Point of Polypropylene-Based Resin>

A melting point of a polypropylene-based resin was measured with use of a differential scanning calorimeter DSC [manufactured by Seiko Instruments Inc., model: DSC6200]. Further, 5 mg to 6 mg of obtained polypropylene-based resin particles were heated from 40° C. to 220° C. at a rate of 10° C./min so that the polypropylene-based resin particles were melted. The polypropylene-based resin particles were then cooled from 220° C. to 40° C. at a rate of 10° C./min so that the polypropylene-based resin particles were crystallized. Subsequently, the polypropylene-based resin particles were heated again from 40° C. to 220° C. at a rate of 10° C./min. A melting peak temperature shown in a DSC curve obtained after the second heating was regarded as a melting point.

<DSC Measurement of Pre-Expanded Polypropylene-Based Resin Particles>

A DSC curve was obtained with use of a differential scanning calorimeter DSC [manufactured by Seiko Instruments Inc., model: DSC6200]. Specifically, 5 mg to 6 mg of obtained pre-expanded polypropylene-based resin particles were heated from 40° C. to 220° C. at a rate of 10° C./min so that the pre-expanded polypropylene-based resin particles were melted, and the DSC curve was obtained. Note that, in a case where an obtained DSC curve shows "a single melting peak," it is indicated that there is one melting peak having one vertex. Note also that, in a case where an obtained DSC curve shows "two melting peaks," it is indicated that there are two melting peaks, having respective two vertexes, on a higher-temperature side and a lower-temperature side, respectively.

<Open Cell Ratio>

An open cell ratio (%) was calculated in accordance with the following expression. Note that Vc ($cm^3$) represents a volume of pre-expanded polypropylene-based resin particles which volume was obtained in accordance with a method defined in PROSEDURE C of ASTM D2856-87.

$$\text{Open cell ratio (\%)}=((Va-Vc)\times 100)/Va$$

Note that Vc was measured with use of an air comparison pycnometer (manufactured by TOKYO SCIENCE, model: 1000). Note also that Va ($cm^3$) represents an apparent volume of the pre-expanded polypropylene-based resin particles which apparent volume was determined as follows: after Vc of the pre-expanded polypropylene-based resin particles was measured with use of the air comparison pycnometer, the pre-expanded polypropylene-based resin particles were entirely submerged in ethanol in a graduated cylinder, and an apparent volume of the pre-expanded polypropylene-based resin particles was determined from a difference in liquid level in the graduated cylinder (submersion method).

<Internal Open Cell Ratio>

Obtained pre-expanded polypropylene-based resin particles were each cut in half with use of a razor blade. Half-cut hemispherical pre-expanded polypropylene-based resin particles thus obtained were measured by a measurement method similar to that for the "open cell ratio," and an obtained open cell ratio was regarded as an internal open cell ratio.

<Expansion Ratio of Pre-Expanded Polypropylene-Based Resin Particles>

Approximately not less than 3 g and not more than 10 g of obtained pre-expanded polypropylene-based resin particles were taken and dried at 60° C. for 6 hours. Subsequently, the pre-expanded polypropylene-based resin particles were subjected to conditioning in a room held at a constant temperature of 23° C. and constant humidity of 50%, and then a weight w (g) of the pre-expanded polypropylene-based resin particles was measured. Thereafter, a volume v ($cm^3$) of the pre-expanded polypropylene-based resin particles was measured by the submersion method, and absolute specific gravity ρb (ρb=w/v) of the pre-expanded polypropylene-based resin particles was calculated. Then, an expansion ratio K (K=ρr/ρb) was calculated from a ratio between the absolute specific gravity ρb of the pre-expanded polypropylene-based resin particles and a density ρr of a polypropylene-based resin before expansion. Note that, in each of Examples and Comparative Examples below, the density ρr of the polypropylene-based resin before expansion was set to 0.9 g/$cm^3$.

<Average Cell Diameter of Pre-Expanded Polypropylene-Based Resin Particles>

With use of a two-edged blade razor [manufactured by FEATHER Safety Razor Co., Ltd., two-edged blade of high stainless steel], a pre-expanded particle was carefully cut substantially in the middle so that cell membranes were not destroyed. Then, a section of the pre-expanded particle was observed with use of a microscope [manufactured by Keyence Corporation, VHX-100] at a magnification of 100 times, and an image was obtained. On the image thus obtained, a line segment having a length equivalent to 1000 μm was drawn on a portion, other than a surface layer, of the pre-expanded particle. Then, the number n of cells through which the line segment passed was counted, and a cell diameter was calculated by "1000/n" (μm). Similar operation was conducted with respect to 10 expanded particles, and an average of cell diameters of the 10 expanded particles was regarded as an average cell diameter.

<Moldability Evaluation 1>

(Molding method 1): A molding machine "KD345" manufactured by DAISEN Co., Ltd., was used. A block-shaped mold (having a length of 400 mm, a width of 300 mm, and a variable thickness) was caused to have a thickness of 44 mm, and was filled with pre-expanded polypropylene-based particles. The mold was then compressed so as to have a thickness of 40 mm. Subsequently, air in the mold was expelled by steam having pressure of 0.1 MPa (gage pressure), and then the pre-expanded polypropylene-based particles were heat-molded for 10 seconds with use of heating steam having given pressure. A polypropylene-based resin expanded molded product was thus obtained. In so doing, the polypropylene-based resin expanded molded product was prepared by increasing the pressure of the heating steam (heating steam pressure) from 0.15 MPa (gage pressure) in increments of 0.01 MPa.

(Evaluation method 1): The obtained expanded molded product was left to stand in a drying chamber at 75° C. for 24 hours, and was then left to stand at an ambient temperature for 4 hours. An evaluation target expanded molded product was thus obtained. The evaluation target expanded molded product was evaluated in terms of (i) a rate of fusion and (ii) deformation and shrinkage. The lowest heating steam pressure at which the rate of fusion was accepted was regarded as the lowest molding pressure, and the highest heating steam pressure at which the deformation and shrinkage fell within an acceptable range was regarded as the highest molding pressure. A difference between the highest molding pressure and the lowest molding pressure was regarded as a molding process heating range, and moldability was evaluated in accordance with a numerical value of the molding process heating range.

A: The molding process heating range was not less than 0.04 MPa.

B: The molding process heating range was not less than 0.02 MPa and less than 0.04 MPa.

C: The molding process heating range was less than 0.02 MPa.

*1) Evaluation of Rate of Fusion

A crack having a depth of approximately 5 mm was made in a surface of the obtained expanded molded product with use of a knife. The in-mold expanded molded product was then split along the crack, and a fracture surface was observed. A ratio of the number of destroyed particles observed on the fracture surface to the number of all particles observed on the fracture surface was calculated, and the rate of fusion of the molded product was evaluated. A case where the rate of fusion was not less than 80% was regarded as acceptable.

*2) Evaluation of Deformation and Shrinkage

A metal ruler was placed on a surface, having the largest area, of the obtained expanded molded product so as to pass through the central part of the surface to an end part of the surface, and a size of the largest clearance between the ruler and the molded product was measured. A numerical value of the size was regarded as a deformation and shrinkage amount. A case where the deformation and shrinkage amount was not more than 1.5 mm was regarded as acceptable.

<Moldability Evaluation 2>

(Molding method 2): Obtained pre-expanded polypropylene-based particles were put in a pressure-resistant vessel with which a molding machine was equipped, and were compressed by air having pressure of 0.15 MPa. A block-shaped mold, having a length of 400 mm, a width of 300 mm, and a thickness of 40 mm, was filled with the pre-expanded polypropylene-based particles while the pre-expanded polypropylene-based particles were further being compressed. The pre-expanded polypropylene-based particles were then heat-molded by steam as with the molding method 1. A polypropylene-based resin expanded molded product was thus obtained.

(Evaluation method 2): Moldability was evaluated in accordance with criteria similar to those in the evaluation method 1.

Next, resin materials and a foaming agent used in Examples and Comparative Examples and production methods in Examples and Comparative Examples are described below.

<Polypropylene-Based Resin>

MP-1: A modified polypropylene-based resin obtained as follows. A mixture of 100 parts by weight of PP-1 serving as a raw material polypropylene-based resin and 1.1 parts by weight of t-butyl peroxy isopropylcarbonate serving as a radical polymerization initiator was fed to a φ45 mm twin screw extruder (L/D=40) through a hopper at a rate of 70 kg/hour. The mixture was melted and kneaded at a cylinder temperature of 200° C. and at a revolving rate of 150 rpm. Then, 0.6 parts by weight of an isoprene monomer serving as a conjugated diene compound was fed to the twin screw extruder through an injection section, provided in midstream, with use of a metering pump, and the mixture and the isoprene monomer were melted and kneaded in the twin screw extruder. Extruded strands were water-cooled and finely cut. The modified polypropylene-based resin was thus obtained.

MP-2 to 7: Modified polypropylene-based resins each obtained by a production method similar to that for MP-1, except that the modified polypropylene-based resins were each made to have composition shown in Table 1.

Table 1 shows physical properties of each resin.

<Raw Material Polypropylene-Based Resin>

PP-1: Ethylene random copolymer containing ethylene at a proportion of 3.3% (having a melt flow rate of 8 g/10 minutes and a melting point of 144° C.).

PP-2: Prime Polypro "J721GR" (produced by Prime Polymer Co., Ltd.; ethylene random copolymer, having a melt flow rate of 11 g/10 minutes and a melting point of 153° C.).

TABLE 1

| | | | | Production Example 1 | Production Example 2 | Production Example 3 | Production Example 4 | Production Example 5 | Production Example 6 | Production Example 7 |
|---|---|---|---|---|---|---|---|---|---|---|
| Polypropylene-based resin | | | | MP-1 | MP-2 | MP-3 | MP-4 | MP-5 | MP-6 | MP-7 |
| Composition | Raw material polypropylene-based resin | PP-1 | Parts by weight | 100 | 100 | | 100 | 100 | 100 | |
| | | PP-2 | Parts by weight | | | 100 | | | | 100 |
| | Radical polymerization initiator | TBIC* | Parts by weight | 1.1 | 1.3 | 1.1 | 1.1 | 1.3 | 0.3 | 0.5 |
| | Conjugated diene compound | Isoprene | Parts by weight | 0.6 | 0.5 | 0.7 | 0.5 | 1.0 | 1.0 | 0.8 |
| | MFR | | g/10 minutes | 2.2 | 8.3 | 7.9 | 4.5 | 0.24 | 0.8 | 2.6 |

TABLE 1-continued

| | | | Production Example 1 | Production Example 2 | Production Example 3 | Production Example 4 | Production Example 5 | Production Example 6 | Production Example 7 |
|---|---|---|---|---|---|---|---|---|---|
| | Melting point | ° C. | 145 | 143 | 145 | 145 | 143 | 147 | 146 |
| Physical properties | tan δ | — | 1.05 | 1.52 | 1.62 | 1.22 | 0.52 | 1.14 | 1.52 |
| | V | m/min | 3.9 | 5.6 | 5.5 | 4.4 | 3 | 3 | 3.9 |
| | MT | cN | 9.2 | 7.6 | 7.8 | 7.8 | 7 | 14.4 | 12.4 |
| | Right side (0.32*V + 0.1) of Expression (1) | | 1.35 | 1.89 | 1.86 | 1.51 | 1.06 | 1.06 | 1.35 |
| | Acceptability based on Expression (1) | | Acceptable | Acceptable | Acceptable | Acceptable | Acceptable | Rejected | Rejected |

*t-butyl peroxy isopropylcarbonate

Example 1

In a tumbler, 100 parts by weight of a polypropylene-based resin of a kind shown in Table 2 was blended with 0.15 parts by weight of a cell nucleating agent masterbatch (sodium bicarbonate-based chemical foaming agent master-batch; foaming agent content: 20%, gas yield: 15 ml/g (at a constant temperature of 220° C.×20 minutes), base resin: polyethylene). Resultant blended materials were fed to a φ65 mm-φ90 mm tandem extruder having an end to which a finely cutting device capable of pelletization by watering cut method was connected. The blended materials were melted in a first extruder (φ65 mm) set at 200° C. Subsequently, 2.6 parts by weight of a carbonic acid gas serving as a foaming agent was injected to and mixed with a resultant molten resin. The molten resin thus obtained was then cooled in a second extruder (φ90 mm) set at 146° C., and then extruded to a region having atmospheric pressure, through a die in which 96 micropores each having a diameter of 0.7 mm were arranged, at a discharge quantity of 50 kg/hour. The molten resin was cut with use of a rotating blade immediately after the molten resin was extruded through the die, and then cooled by causing the molten resin to be in contact with hot water having a temperature of 55° C. and flowing inside a drum. Pre-expanded polypropylene-based resin particles were thus obtained which had an expansion ratio of 10.7 times, an open cell ratio of 2%, and an internal open cell ratio of 15° %.

Table 2 shows physical properties of the obtained pre-expanded polypropylene-based resin particles and a result of evaluating the pre-expanded particles by the moldability evaluation method 1.

Examples 2 Through 7

Pre-expanded polypropylene-based resin particles of Examples 2 through 7 were obtained as with Example 1, except that extrusion foaming was carried out with composition and conditions shown in Table 2. Table 2 shows physical properties of the obtained pre-expanded polypropylene-based resin particles and results of evaluating the pre-expanded particles by the moldability evaluation method 1.

TABLE 2

| | | | Examples | | | | | | | Comparative Examples | |
|---|---|---|---|---|---|---|---|---|---|---|---|
| | | | 1 | 2 | 3 | 4 | 5 | 6 | 7 | 1 | 2 |
| Polypropylene-based resin | | Kind | MP-1 | MP-2 | MP-3 | MP-3 | MP-4 | MP-5 | MP-5 | MP-6 | MP-7 |
| | | Parts by weight | 100 | 100 | 100 | 100 | 100 | 100 | 100 | 100 | 100 |
| Foaming agent | Carbonic acid gas | Parts by weight | 2.6 | 2.6 | 2.6 | 2.6 | 2.6 | 3.3 | 3.3 | 3.3 | 2.6 |
| Nucleating agent | | Parts by weight | 0.15 | 0.4 | 0.4 | 0.4 | 0.15 | 0.15 | 0.15 | 0.15 | 0.15 |
| Temperature set on second extruder | | ° C. | 146 | 146 | 148 | 146 | 141 | 146 | 148 | 146 | 148 |
| Physical properties of expanded particles | Expansion ratio | Times | 10.7 | 11 | 12.7 | 12 | 10.3 | 11.5 | 10.8 | 10 | 10 |
| | Average cell diameter | μm | 392 | 350 | 352 | 325 | 452 | 302 | 305 | 307 | 348 |
| | Open cell ratio | % | 2 | 5 | 5 | 5 | 2 | 4 | 3 | 7 | 9 |
| | Internal open cell ratio | % | 15 | 24 | 23 | 22 | 27 | 35 | 33 | 45 | 60 |
| Moldability evaluation | Lowest steam pressure | MPa | 0.18 | 0.18 | 0.18 | 0.18 | 0.17 | 0.26 | 0.26 | — | — |
| | Highest steam pressure | MPa | 0.3 | 0.26 | 0.24 | 0.24 | 0.28 | 0.29 | 0.29 | — | — |
| | Moldability | — | A | A | A | A | A | B | B | C | C |

Examples 8 Through 10

Pre-expanded polypropylene-based resin particles of Examples 8 through 10 were obtained as with Example 1, except that extrusion foaming was carried out with composition and conditions shown in Table 3. Table 3 shows physical properties of the obtained pre-expanded polypropylene-based resin particles and results of evaluating the pre-expanded particles by the moldability evaluation method 2.

TABLE 3

| | | | Examples | | | Comparative Examples | |
|---|---|---|---|---|---|---|---|
| | | | 8 | 9 | 10 | 3 | 4 |
| Polypropylene-based resin | | Kind | MP-1 | MP-1 | MP-3 | MP-6 | MP-7 |
| | weight | Parts by | 100 | 100 | 100 | 100 | 100 |
| Foaming agent | Carbonic acid gas | Parts by weight | 4.5 | 4.5 | 4.1 | 4.5 | 4.5 |
| Nucleating agent | | Parts by weight | 0.05 | 0.15 | 0.05 | 0.05 | 0.05 |
| Temperature set on second extruder | | ° C. | 141 | 141 | 143 | 141 | 143 |
| Physical properties of expanded particles | Expansion ratio | Times | 18.1 | 19.4 | 18 | 18.2 | 18.9 |
| | Average cell diameter | μm | 571 | 375 | 440 | 500 | 410 |
| | Open cell ratio | % | 9.3 | 8.9 | 13.9 | 20.3 | 64.3 |
| | Internal open cell ratio | % | 25 | 30 | 40 | 55 | 81 |
| Moldability evaluation | Lowest steam pressure | MPa | 0.18 | 0.18 | 0.17 | — | — |
| | Highest steam pressure | MPa | 0.24 | 0.22 | 0.2 | — | — |
| | Moldability | — | A | A | B | C | C |

Comparative Examples 1 Through 4

Pre-expanded polypropylene-based resin particles were obtained as with Example 1, except that extrusion foaming was carried out with composition and conditions shown in Table 2. The obtained expanded particles had high internal open cell ratios, and it was therefore difficult to obtain proper molded products.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claim is:

1. Pre-expanded polypropylene-based resin particles comprising a polypropylene-based resin, wherein the polypropylene-based resin satisfies tan $\delta<0.32\times V-0.14$, where tan δ represents a loss tangent at an angular frequency of 0.1 rad/s in dynamic viscoelastic behavior measurement at 200° C. and V represents a melt fracture take-up speed (m/min) at 200° C., and wherein the pre-expanded polypropylene-based resin particles have a single melting peak.

2. The pre-expanded polypropylene-based resin particles according to claim 1, wherein tan δ is 0.50 to 1.80.

3. The pre-expanded polypropylene-based resin particles according to claim 1, wherein V is 2.5 to 7.0 (m/min).

4. The pre-expanded polypropylene-based resin particles according to claim 1, wherein a melt flow rate of the polypropylene-based resin is 1.0 g/10 minutes to 10.0 g/10 minutes.

5. The pre-expanded polypropylene-based resin particles according to claim 1, wherein a melting point of the polypropylene-based resin is 135° C. to 155° C.

6. The pre-expanded polypropylene-based resin particles according to claim 1, wherein an internal open cell ratio of the pre-expanded polypropylene-based resin particles is not more than 40%.

7. The pre-expanded polypropylene-based resin particles according to claim 6, wherein the internal open cell ratio of the pre-expanded polypropylene-based resin particles is not more than 30%.

8. The pre-expanded polypropylene-based resin particles according to claim 1, wherein an open cell ratio of the pre-expanded polypropylene-based resin particles is not more than 6%.

9. The pre-expanded polypropylene-based resin particles according to claim 1, wherein a melt tension of the polypropylene-based resin is not more than 12 cN.

10. A method for producing pre-expanded polypropylene-based resin particles according to claim 1, the method comprising:

feeding a polypropylene-based resin and a foaming agent to an extruder;

melting and kneading and cooling the polypropylene-based resin and the foaming agent to obtain a molten resin containing the foaming agent; and extruding the molten resin, containing the foaming agent, to a lower-pressure region through a microporous die, attached to an end of the extruder, and finely cutting the molten resin extruded.

11. An expanded molded product which is obtained by molding, in a mold, pre-expanded polypropylene-based resin particles according to claim 1.

* * * * *